United States Patent

[11] 3,568,166

[72] Inventors Herveline Jeudon Gentilly; Claude Fernandes, Chatillon-sous-Bagneux; Jean-Pierre Felix, Palaiseau, France

[21] Appl. No. 802,823
[22] Filed Feb. 27, 1969
[45] Patented Mar. 2, 1971
[73] Assignee Commissariat A L'Energie Atomique Paris, France

[54] METHOD AND DEVICE FOR DIGITAL ANALYSIS
8 Claims, 3 Drawing Figs.

[52] U.S. Cl. .......... 340/172.5
[51] Int. Cl. .......... G06f 9/18
[50] Field of Search .......... 340/172.5; 235/157

[56] References Cited
UNITED STATES PATENTS

| | | | |
|---|---|---|---|
| 3,059,228 | 10/1962 | Beck et al. | 340/172.5X |
| 3,146,424 | 8/1964 | Peterson et al. | 340/172.5 |
| 3,148,353 | 9/1964 | Schumann | 340/172.5 |
| 3,345,616 | 10/1967 | Avril et al. | 340/172.5 |

*Primary Examiner*—Raulfe B. Zache
*Attorney*—Cameron, Kerkam and Sutton

ABSTRACT: A recurrent signal consisting of pulses which can be identified in time is analyzed in order to extract the signal from the background noise; samples of a first pulse are taken at instants which are separated by predetermined time intervals Y, and digitalized, the result is written in an addressable digital memory channel by a digital adder-subtracter, a zero level determined by sampling by the same sampling circuit at a selected instant is subtracted from the contents of each channel of the digital memory and the same sequence is carried on a large number of pulses which come later than the first pulse the samples being added in the digital memory channels.

The successive samples of a same pulse are stored in a plurality of time delaying channels each having an analogue storage capacitor. A single lengthening channel may be used and an intermediate memory device fed by the coder stores the zero level and applies it to the input of the adder-subtracter.

METHOD AND DEVICE FOR DIGITAL ANALYSIS

The invention relates to the digital analysis of a recurrent signal and is directed to a device for the digital analysis of said signal for the purpose of extracting this latter from background noise which has no phase relationship therewith and which can have a much greater amplitude than that of said signal.

This method of digital analysis is applicable to a periodically recurrent signal or to a signal which is identified in time with respect to a synchronizing pulse, this pulse being usually related to the physical cause underlying the phenomenon which is being studied and which is represented by the signal under analysis.

For the sake of enhanced clarity, it will be considered in the following description that the recurrent signal is constituted by individual pulses which can be identified in time. The term "pulse" has been chosen on account of the fact that, in the majority of cases, the time interval which elapses between two successive pulses is considerably longer than the duration of one pulse or at least of that portion of said pulse which is to be analyzed. However, the use of this term is not intended to imply that the scope of this patent should be restricted to any particular type of signal.

It may prove useful at this juncture to restate the principle of extraction of a useful signal $S(t)$ from accompanying background noise $B(t)$ by taking samples of the signal under analysis $f(t) = S(t) + B(t)$ at corresponding instants of successive pulses. If it is assumed that each sample is extracted N times and that these N extractions are summated in a storage channel, the final signal $S(t)$ is N times greater than the signal which is collected at each transmission whereas the resultant noise (constituted by the root-mean-square value of noise) increases only at $\sqrt{N}$. Moreover, it is known that, in order to pass $N_1$ harmonic of a signal, it is necessary to collect 1 samples.

In order to apply the foregoing principle, two types of apparatus have been employed up to the present time, one of these being the multichannel digital analyzer. Unfortunately, the minimum time $2N_b$etween two successive samples taken from a same pulse is relatively long (over 40 $\mu$sec) which makes it impossible to study rapidly variable phenomena. Finally, commercially available analyzers have a storage-word length which is too short and does not permit of sufficient accumulation for good extraction of the signal from the noise when the noise level is high and when the signal varies over a wide range. This defect cannot readily be eliminated since analyzers have memory or storage devices consisting of toroidal ferrite cores which are difficult to modify.

Use has also been made of multichannel analyzers of the analogue storage-type. These analyzers have the advantage of permitting analysis of signals at a high sampling rate, on condition, however, that the repetition rate of these signals is high (for example at least one pulse per millisecond in order to take 100 samples at intervals of 1 $\mu$sec). These analyzers are subject to a number of drawbacks. In the first place, they provide a relatively low degree of accuracy and call for laborious alignment of the channels one by one.

This alignment is made necessary by the drifts of the "zero level" of each channel, that is to say of the continuous signal which can be superimposed on the real signal to be analyzed. This continuous signal has different causes such as the gain drift of amplification channels and especially residual switching voltages; the alignment referred to consists in introducing in each channel capacitances which are intended to equalize said zero levels.

Finally, neither of the two devices mentioned above is suited to subtraction of the "zero level." It would even be impossible to perform this subtraction in a faithful manner in an analogue analyzer by reason of the fact that the characteristics of the analogue subtracter vary progressively in time.

The aim of the present invention is to provide a method and device which are not subject to the disadvantages of systems of the prior art or at least in which such disadvantages are minimized.

With this objective, the invention proposes a method of digital analysis of a recurrent signal consisting of pulses which can be identified in time in order to extract said signal from the background noise, wherein said method comprises taking samples of a first pulse at instants which are separated by predetermined time intervals Y, representing in digital code a sample to which there may be added a predetermined continuous level which is sufficient to prevent the application of negative signals to the digital-analogue coder, writing the result in an addressable digital storage channel by means of a digital adder-subtracter, subtracting from the contents of each of the digital memory device a zero level determined by sampling by means of the same sampling circuit at a selected instant with respect to the appearance of said pulse, carrying out the same operations on a large number of pulses which come later than the first pulse and collecting the samples in said digital storage channels by means of the adder to which are simultaneously applied the contents of each of said channels in turn and the output of the coder.

It is important to note that the subtraction of the zero level is carried in a digital manner, that is to say with an error which cannot be greater than that which results from the coding. On the contrary, if it was sought to perform a subtraction of this kind in a system based solely on analogue computation, this operation would be attended by an error which is variable in time by reason of the instabilities of analogue systems.

In a first mode of application of the invention, the successive samples of a same pulse are stored in a plurality of lengthening channels (comprising an analogue storage capacitor) and the contents of each of the channels is coded successively at a rate which is lower than the sampling rate, said storage of corresponding samples taken from two successive pulses being effected in two different analogue channels which are advantageously subtracted from each other by circular switching of all the lengthening channels.

In this case, the extraction of the zero level from each digital storage channel must obviously be carried out in the same lengthening channels as the corresponding samples in order to take into account any possible nonidentity of lengthening channels: it will therefore be found necessary to repeat the sampling and coding sequences (coding being followed by subtraction) starting from an instant which has a predetermined timelag with respect to the end of writing of samples in digital memory.

This mode of application is of particular interest when it is necessary to take samples at a high rate. In practice, the sampling rate is limited only by the rapidity of the analogue storage feed and of the linear gates. Reading can be performed at a much lower rate which is compatible with the speed of a coder having a word length which is sufficient to ensure satisfactory precision.

Temporary storage of the samples and of the zero level in analogue form cannot result in an appreciable error inasmuch as the storage is extremely short and is carried out within the same channels in the case of each sample and in the case of the zero level which is subsequently to be subtracted therefrom. The need to code the zero level and to perform a subtraction in the case of each lengthening channel does not usually constitute a disadvantage since the period which elapses between two successive pulses is usually of very appreciable length.

The invention will become clear from the following description of modes of application of the invention which are given by way of example without thereby implying any limitation whatsoever. The description refers to the accompanying drawings, wherein.

Figure 1:
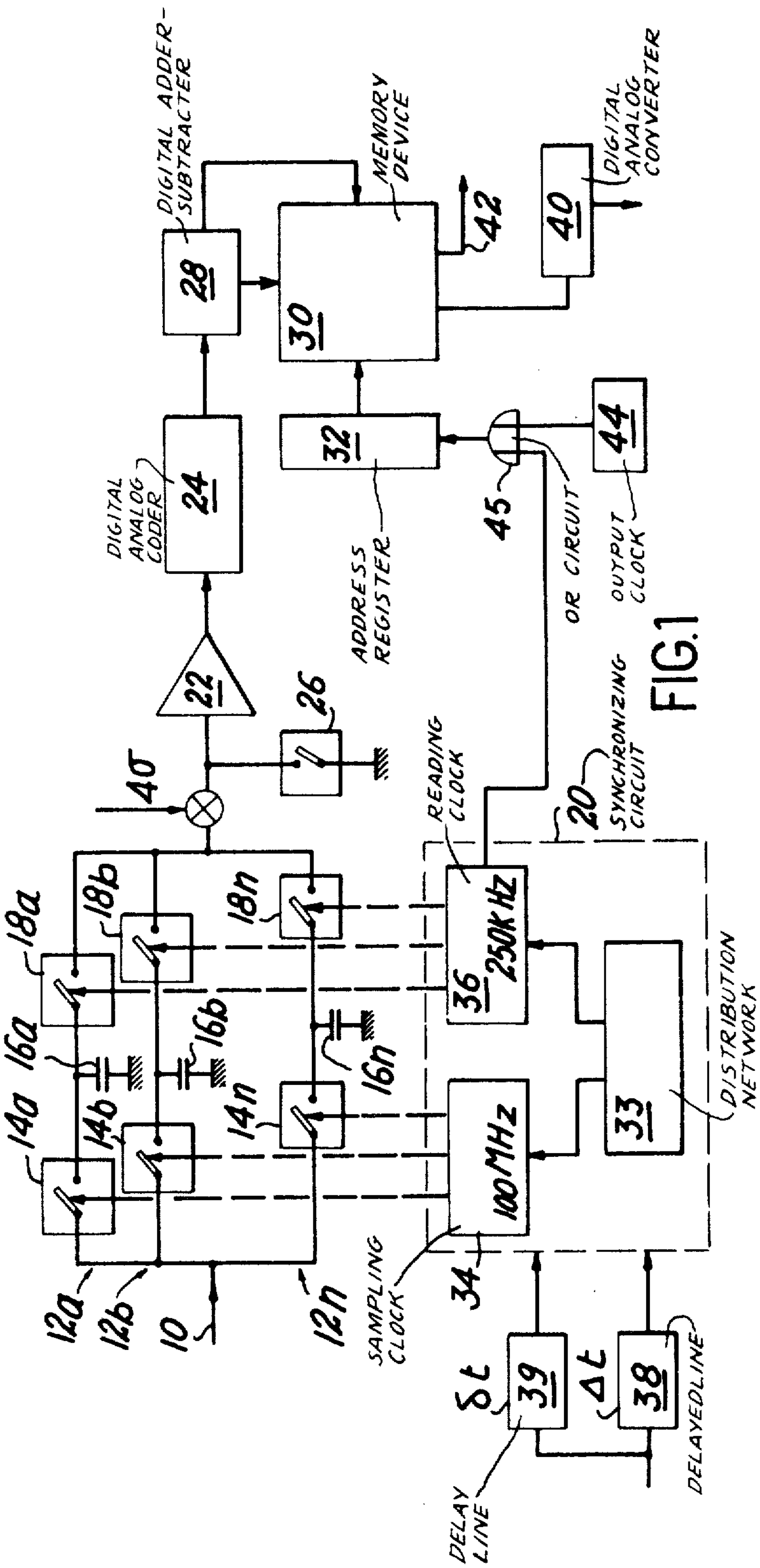
FIGS. 1 and 2 are block diagrams of analyzing devices which constitute two modes of application of the invention.

The analyzing device which is illustrated in FIG. 1 receives a signal consisting of successive pulses at its input 10. This input is coupled to a plurality of lengthening channels $12_a$, $12_b$, ... $12_n$ equal in number to the samples to be taken from each pulse. The channels are of identical construction: the channel $12_a$, for example, comprises a linear sampling gate $14_a$, a capacitor $16_a$ for storing the sample in analogue form and a linear reading gate $18_a$. Said linear gates which are represented by switches in FIG. 1 for the sake of greater simplicity are controlled by a synchronizing circuit 20 which will be described hereinafter. It is an advantage to employ fast gates of the diode type as linear sampling gates and to employ gates of the field-effect transistor type as reading gates.

The outputs of all the lengthening channels $12_a$, $12_b$... $12_n$ are connected to an amplifier 22 which is intended to bring the level of the logic signals supplied by the channels to a level which is sufficient to feed a digital-analogue coder 24. Between the lengthening channels and the amplifier 22 is connected a gate 26 which, when it is closed at the same time as one of the linear reading gates, makes it possible to short circuit the corresponding capacitor to ground and to discharge this latter. It is apparent that the function of the lengthening channels $12_a$, $12_b$... $12_n$ is to present each sample to the coder for a period of time which is compatible with its correct operation or, in other words, to make the sampling time independent of the coding time.

The coder 24 drives a digital adder-subtractor 28 having two data inputs. When a synchronizing signal is received, the contents of said adder are transferred into one of the channels of a digital storage or memory device 30 associated with an address register 32 for selecting the channel which receives the contents of the adder. Each channel of the memory device 30 must have a large number of binary positions in order to be capable of accumulating a large number of samples. By way of example, it can be noted that $9 \times 10^4$ counts must be achieved if it is desired to improve the signal/noise ratio in a proportion of 300:1; and if it is required to achieve a precision of 1 percent in a signal having an amplitude which varies between 1 and 100, provision must be made for a memory device having 30 binary positions per channel whereas the memory devices with toroidal ferrite cores at present in use provide as a rule only eight to 16 binary positions. Memory devices having integrated circuits have been employed.

It is obviously an advantage to utilize an input coder which is as fast as possible for supplying the requisite number of binary positions. By way of example, there are at present available coders having nine binary positions operating in 2 $\mu$secs. and 15-position coders which operate in 5.2 $\mu$secs.

The synchronizing circuit 20 may be a distribution network 33 for the initial distribution from channels 12, a sampling clock 34 and a reading clock 36 having a frequency which is distinctly lower than that of the sampling clock. The frequency of the sampling clock 34 establishes the timer interval between two successive sampling operations and it will be advantageous to adopt the fastest available clock, namely at the present time a clock which achieves a frequency of 100 Mc/s. The frequency of the reading clock is established by the speed of the coder 24. It will generally be found necessary to adopt a clock having a frequency of approximately 250 Kc/s.

The network 33 for the initial distribution of channels must carry out the circular switching of the lengthening channels $12_a$, $12_b$... $12_n$ which are assigned to samples corresponding to two successive pulses. Different types of circuits are known employing one or two shifting registers which can perform this function. It is possible in particular to adopt a shifting register having N binary positions for controlling the gates by means of the clocks and a counter having N-1 binary positions for carrying out the circular switching of channels which are assigned to the corresponding samples of two successive pulses.

The reading clock 36 evidently controls at the same time and at time intervals corresponding to its frequency on the one hand one of the reading gates and, on the other hand, the address register in order to cause it to advance by one position.

The sequence of operation of the synchronizing circuit 20 is initiated by a time marker pulse which is applied either to a sampling input of said circuit (the marker pulse is delivered to the circuit from a single synchronizing pulse or "pip" with a time-delay $\Delta t$ supplied by an adjustable delay-line 38) or to a zero-level input (this marker pulse being delivered to said circuit from the same single synchronizing pip via a delay-line 39 which produces a time-delay $\delta t$.

It will be apparent that output elements such as a digital-analogue converter 40 for displaying the results, a digital output 42 and so forth are associated with the digital memory device 30. Control of the outputs initiates at the same time the changeover of the input of the address register 32 of the reading clock 36 to an output clock 44 via an OR circuit 45.

The operation of the device hereinabove described has been brought out by the foregoing definition of the method and by the description which has just been given and will therefore be discussed only briefly.

The operation is initiated at the time of arrival of a pulse by means of a synchronizing pip which is applied at the instant $t_0$ to the delay lines 38 and 39 in which are set up the time-delays $\Delta t$ and $\delta t$, these time-delays being selected so that sampling should take place in the useful part of the pulse and that the zero level should be taken during a suitable period. At the instant $t_0 + \Delta t$, the delay line 38 drives the synchronizing circuit 20. If it is assumed that the analyzed pulse is the first pulse of the signal, the sampling clock 34 of the network will successively open the gates $14_a$, $14_b$... $14_n$ from the instant $t_0 + \Delta t$ and at time intervals Yprovision can accordingly be made, for example, for 16 gates which correspond to 16 lengthening channels and which are opened at a frequency of 100 Mc/s.

Once the sampling operation is completed, the synchronizing circuit 20 controls the reading with a time-delay which can be adjustable. This reading is carried out channel by channel at a rate which is fixed by the reading clock 36. Said clock first initiates the opening of the gate $18_a$ in order to transfer the contents of the lengthening channel $12_a$ to the coder 24 and the operation of the parallel digital adder-subtracter which in any case does not receive any contents of the memory device in this case. In consequence, it is the result of the coding operation which is directly transcribed in a digital memory channel 30 which is determined by the address register 32.

The synchronizing circuit 20 then produces the opening of the gate $18_b$. At the same time, said circuit transmits to the address register a signal which causes this latter to advance by one position and associates with the adder 28 a further channel of the digital memory device 30. The contents of the lengthening channel $12_b$ are amplified, coded and stored in the new channel of the memory device: the contents of all the lengthening channels are thus transferred in turn and in digital form to the memory device 30.

When the pulse sampling operation is completed, the zero level must in turn be transmitted by each of the lengthening channels and subtracted numerically from the contents of the corresponding digital storage channel. At the end of the period $\delta t$ from the instant $t_0$, the delay line controls the circuit 20 which carries out the same sampling sequence as before. Reading, coding and control of the address register are also identical but the adder-subtracter 28 is controlled so as to subtract the zero level from the contents of the memory channel 30 and to return the result to storage.

It should be noted that a sufficient level can previously have been introduced in each channel of the digital memory device 30 to ensure that the subtraction referred to above does not tend to bring the memory device 30 to a negative content at the time of subtraction: this level can be, for example, four times the variance of the noise.

When a second pulse arrives and is preceded by a further synchronizing pip at an instant $t_1$, the circuit 20 activates the sampling gates of the lengthening channels starting with the second channel $12_b$ and so on in sequence. Once all the samples have been taken and temporarily stored in analogue form in the capacitors $16_b$... $16_n$, $16_a$, it initiates transfer to the digital memory device at the rate which is established by the reading clock 36. At the same time, the synchronizing circuit supplies to the address register 32 shifting pulses which initiate transfer of the contents of the corresponding channel of the digital memory device 30 each time the coded contents of a lengthening channel arrive in the adder 28. Subtraction of the zero level is then carried out as in the case of the first pulse. Samples derived from successive pulses of the signal to be separated from the background noise are thus accumulated within the channels of the digital memory device 30.

It is apparent that the invention makes it possible to transfer all the samples by way of a same amplification and coding channel and to compensate for any possible differences between lengthening channels by circular switching of these latter (both in the case of the samples an and in the case of the zero level), thereby removing their defects. Temporary storage in analogue form does not present any disadvantage since it is only of very short duration and the same applies to the time interval which elapses between the storage of a sample and the storage of the corresponding zero level.

Figure 2:
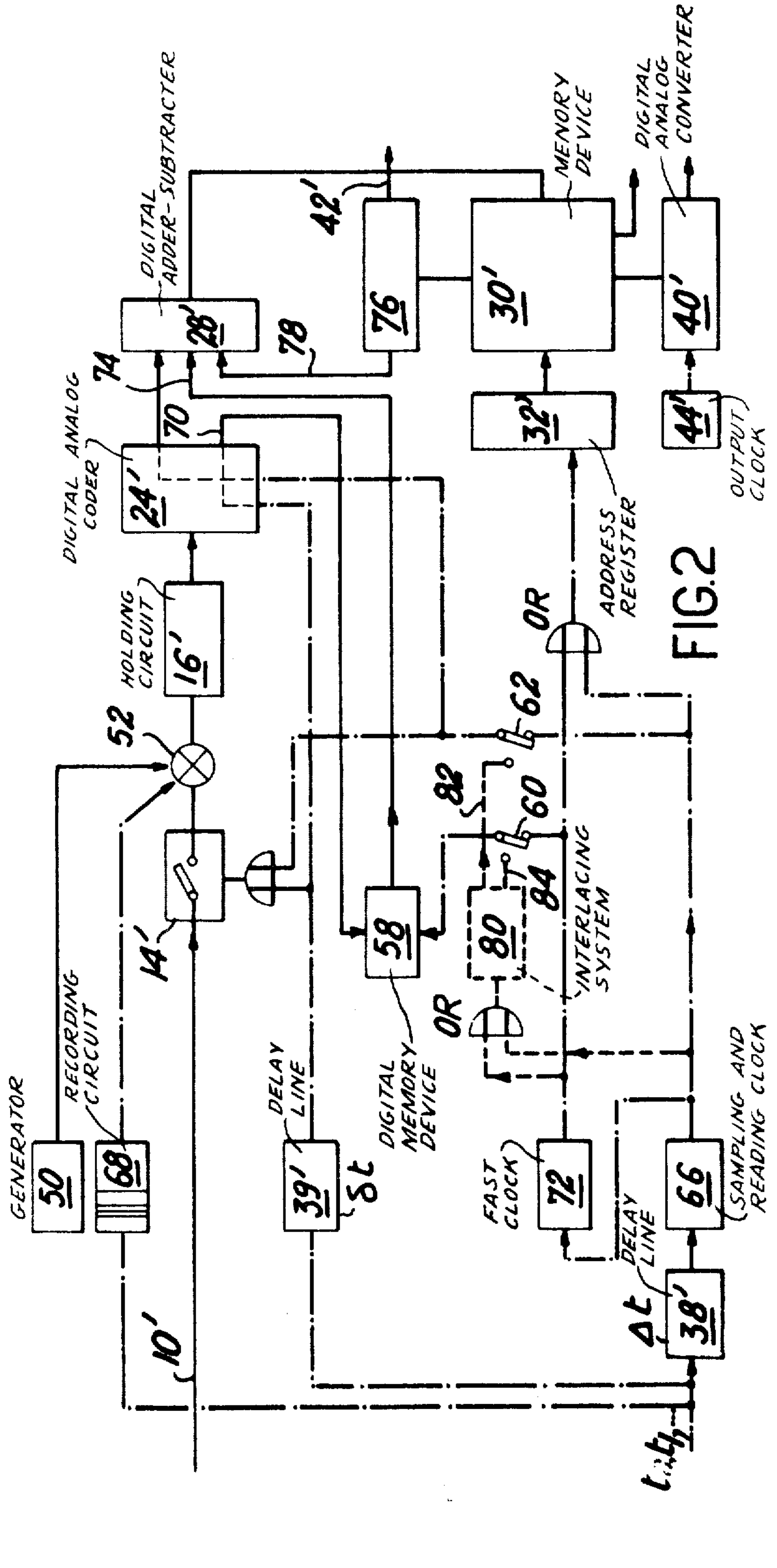

The mode of application of the invention which is shown in FIG. 2 differs from that of FIG. 1 especially in the absence of temporary intermediate storage of all the samples in analogue form prior to successive reading of all said samples. There is again shown in FIG. a memory device which is very similar to that which has just been described. On the other hand, the analogue and sampling unit is different and consideration will be given to this unit in the main part of the description which now follows.

For the sake of enhanced clarity, the following conventional representations have been adopted in FIG. 2: data transfers are shown in full lines and logic controls are shown in chain-dotted lines; the elements corresponding to those of FIG. 1 are designated by the same reference numerals to which is assigned the prime index; dashed lines are employed to represent those portions of the diagram which correspond to interlacing of samples, although this may be dispensed with if it is considered acceptable to take samples at time intervals either equal to or longer than the period of operation of the coder.

The switches 60 and 62 of the diagram are also shown in an arrangement in which they cut out of circuit those elements which are specifically intended to carry out sample interlacing.

The device which is illustrated in FIG. 2 comprises a signal input 10' and a control input which supplies synchronizing pips to adjustable delay lines 38' and 39'. Said device comprises a generator 50 for producing an adjustable continuous level $\theta$. This level $\theta$ is chosen so as to correspond to the variance of the noise and is determined by experiment. The intended function of the continuous level is to prevent the appearance within the coder of negative input signals (which would create the need for a coder having double polarity) and to prevent any risk of negative contents in the digital memory device (which would make it necessary to introduce a sign in this latter). The transmission of the level $\theta$ is controlled by a recording circuit 68 which will be described hereinafter.

The signals which arrive at the input 10' all pass through the said analogue channel. Said channel comprises a linear sampling gate 14' connected by a switch 52 to holding circuit 16' which can consist of a capacitor-type analogue memory device which is similar to the lengthening channels of FIG. 1. The output of said circuit 16' is applied to the digital-analogue coder 24' which feeds the parallel digital adder-subtractor 28'.

The coder is also designed to effect the coding of the "zero level" once in respect of each pulse in order to store said level in an ancillary memory device in digital form. This zero level is collected at the input 10' with a time-delay $\delta t$ which is established by the delay line 39', and is applied to the coder 24'. The time-delay $\delta t$ is determined as a result of experiment. After coding, the zero level is stored in an ancillary digital memory device 58.

The design function of the holding circuit 16' is to present to the coder 24' each signal received by said circuit during a period which is sufficient for its operation. By way of example, there has actually been constructed a device in which the holding circuit receives each signal for a period of 7 μsecs. and presents said signal to the coder for a period of 18.5 μsecs. The signal thus presented to the coder can be:

either the sum of the direct-current bias voltage which is constituted by the continuous level $\theta$ supplied by the generator 50 (which is intended to prevent a negative signal from being presented to the coder) and of the sample;

or the sum of $\theta$ and of the zero level (once prior to each pulse);

or alternatively the level $\theta$ for the purpose of introducing $4\theta$ in the contents of each channel of the digital memory device 30' (once prior to analysis of a signal).

The operation of the coder 24', of the address register 32' and of the gate 14' is controlled by a sampling and reading clock 66 which is compatible with the operation of the coder: depending on the type of coder, the clock pulses can be separated by a time interval ranging from 0.5 to 5 μsecs.

The operation of the device without sample interlacing is as follows: starting from the instant $t_0$ at which a synchronizing pulse is applied to the input, the delay lines 38' and 39' having been previously set to fix on the one hand the commencement of sampling with respect to the arrival of the synchronizing pulse and on the other hand by delaying the storage of the zero level with respect to the same instant $t_0$.

The synchronizing pip which corresponds to the first pulse is transmitted to a circuit 68 for recording in memory the level $4\theta$ which permits coding of this continuous level and transmission thereof into each channel of the memory device through the switch 52 and the holding circuit. The three following synchronizing pips initiate the same transfer so that the level $4\theta$ can thus be stored in the memory device in digital form. This will forestall any subsequent danger of bringing the memory device to zero as a result of accumulation of negative signals arising from background noise. The loss of the four first pulses of the signal for sampling purposes does not carry any disadvantage in view of the very large number of pulses employed for sampling. The circuit for recording $4\theta$ then ceases to operate until completion of analysis of the signal considered.

Starting from the fifth synchronizing pip at the instant $t_5$, the operation is different and entails in sequence storage of the zero level, sampling and subtraction of the zero level.

It is apparent that reading of the zero level will either precede or follow the sampling operation as the case may be.

At the instant $t_5 + \delta t$, the coder receives via the linear gate 14', the switch 52 and the holding circuit 16' the sum of the level $\theta$ and of the zero level which it transmits to the ancillary memory device 58 via its output 70.

At the instant $t_5 + \Delta t$, then at time intervals Y, the clock 66 will initiate a first sampling operation: the coder transmits in each case into one channel of the digital memory device 30' the sum of $\theta$ and of the sample.

Once all the samples have been taken, the fast clock 72 relays the clock 66 to initiate subtraction of the contents of the ancillary memory 58 without erasing this latter: this subtraction is carried out in the adder subtracter 28' at which the contents of the ancillary memory arrive via 74 and the contents of each channel of the memory device 30' arrive via the output register 76 and the input 78. These subtractions are carried out solely in digital computation and are much faster than the preceding. It is possible to employ a clock having a frequency of several Mc/s, the speed of which is limited only by the speed of operation of the adder and the cycle of storage of data in the digital memory device and of rewriting of said data.

The device which has just been described provides an advantage over that of FIG. 1 in that there is no intermediate storage of samples in lengthening channels which are equal in number to the samples and that it also permits analysis of pulses which have closer spacing in time. On the other hand, the sampling rate of this device is limited by the speed of the coder 24'.

Figure 3:
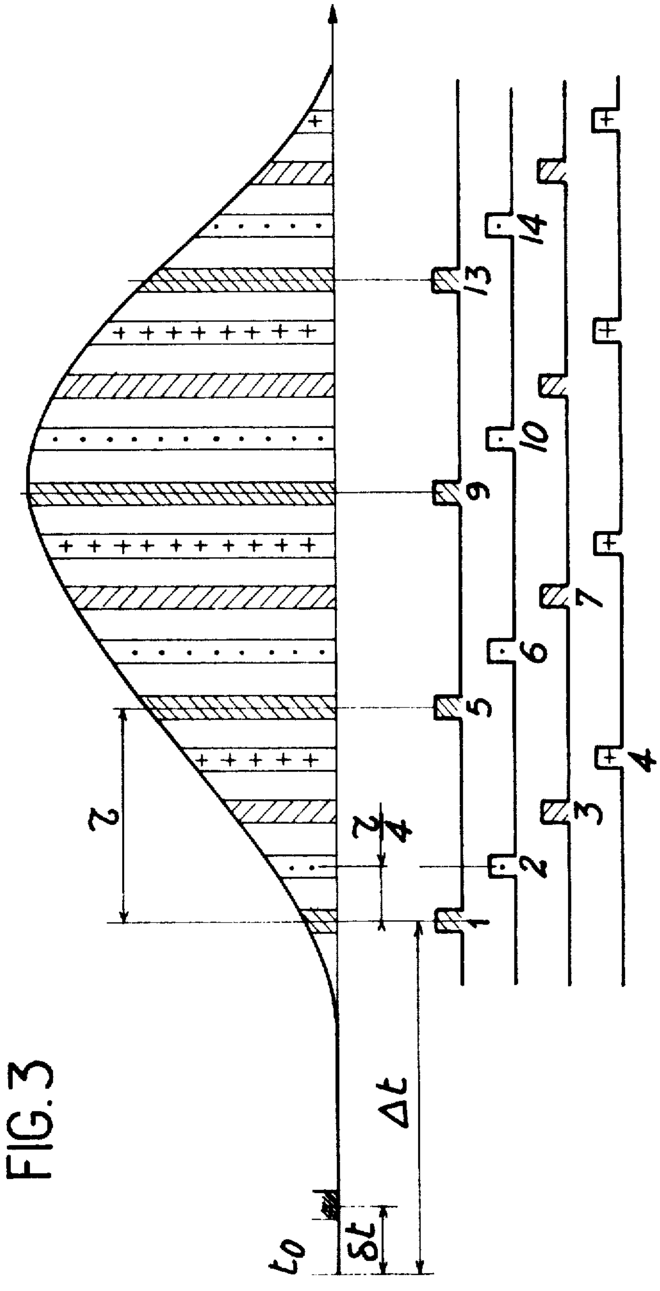
FIG. 3 is an explanatory diagram illustrating the interlacing of samples taken from successive pulses.

In an alternative embodiment of the device of FIG. 2, this limitation is removed by providing an interlacing system which makes it possible to reduce the spacing of samples. The principle of interlacing is shown diagrammatically in FIG. 3. It consists in extracting the samples from $n$ successive pulses, not at corresponding instants but at instants which are relatively displaced by $t/n$. For example, in order to take samples at a rate corresponding to four times the coding time Y, it is only necessary to employ a clock for shifting the address register of the memory device whose pitch is equal to Y/4. In the case illustrated in FIG. 3, the linear gate 14' will be open for the clock pulses 1, 5, 9 etc.... and writing in memory will be performed at the times 5, 9, 13, etc.... At the second pulse, the linear gate will be opened at the times 2, 6, 10, etc. ... and writing will take place at the times 6, 10, 14, etc. ... in digital memory channels which will be different from the first. In order to obtain a same number of samples in a given order, it is obviously necessary on the other hand to accumulate over a number of pulses which is four times greater and therefore for a period of time which is four times longer.

In the case of operation with sample interlacing, the device of FIG. 2 comprises the elements which are depicted in dashed lines and the switches 60 and 62 are brought into the positions in which they are represented in the opposite position for putting the sample interlacing system 80 into service.

The operation of the device is then the same as before in regard to placing the level $4\theta$ in digital memory and in regard to placing both the sum of the zero level and the level $\theta$ in the ancillary memory device 58. On the other hand, sampling is carried out in a different manner as indicated earlier, the system 80 initiates only a single sampling operation (controlled by the output 82) in respect of four shifts of the address register 32' at the end of analysis of a pulse and the subtraction of the zero level as controlled by the output 84 is carried out in the same channels of the digital memory device 30'. Samples are taken from the following pulse at instants which are displaced by Y/4 relative to the preceding and transmitted into different channels of the memory device 30' and so on in sequence.

I claim:

1. A method of digital analysis of a recurrent signal consisting of pulses which can be identified in time in order to extract said signal from the background noise, wherein said method comprises taking samples of a first pulse at instants which are separated by predetermined time intervals Y, representing in digital code a sample to which there may be added a predetermined continuous level which is sufficient to prevent the application of negative signals to the digital-analogue coder, writing the result in an addressable digital memory channel by means of a digital adder-subtracter, subtracting from the contents of each of said channels of the digital memory device a zero level determined by sampling by means of the same sampling circuit at a selected instant with respect to the appearance of said pulse, carrying out the same operations on a large number of pulses which come later than the first pulse and collecting the samples in said digital memory channels by means of the adder to which are simultaneously applied the contents of each of said channels in turn and at the output of the coder.

2. A method as claimed in claim 1, including the steps of storing successive samples of a same pulse in a plurality of lengthening channels comprising an analogue storage capacitor and then coding the contents of each channel in turn at a rate which is lower than the sampling rate, said storage of corresponding samples which are taken from two successive pulses being carried out in different analogue channels and then subtracting the sample from each other by circular switching of all the lengthening channels.

3. A method as claimed in claim 1, including the steps of displacing the instants of sampling of each successive pulse relatively by a time interval $Y/n$ when passing from one pulse to the next and then coding these samples out at time intervals equal to Y.

4. A method as claimed in claim 1 for analyzing a signal accompanied by a noise having a variance which is greater than the level of the signal, including the step of writing in in each channel of the digital memory device a predetermined content having a value which is greater than the variance in background noise in order to prevent any appearance of a negative content in the memory.

5. A digital analyzing device comprising at least one lengthening channel, means for applying to the channel or channels successive samples of a same pulse,

- a digital-analogue coder supplied by the lengthening device,
- a digital memory device having a number of channels at least equal to the number of samples,
- a digital adder-subtracter fed by the digital memory device and the coder,
- said memory device being coupled with the adder-subtracter so that each new sample coded in digital representation is added to or subtracted from the preceding contents of the corresponding channel of the memory device,
- and means including a synchronizing circuit coupled to said lengthening channels for placing in digital memory a level which is higher than the variance of the noise, reading and storing the zero level, adding the corresponding pulse samples to the contents of each channel of the memory device and subtracting the stored zero level.

6. A device as claimed in claim 5, comprising one of said lengthening channels and an intermediate memory device fed by the coder for storing the zero level and applying said level to the input of the adder-subtracter.

7. A device as claimed in claim 5 comprising a plurality of lengthening channels each provided with a linear gate associated with a time base having a predetermined frequency for extracting the zero level or levels from the samples of a pulse and storing them in successive lengthening channels and a second linear gate also associated with a time base for coupling each lengthening channel in turn through a digital analogue coder to a digital adder-subtracter for summation of the sample and the contents of the corresponding channel of the addressable digital memory device or subtraction of the zero level from said contents.

8. A device as claimed in claim 5, wherein said synchronizing circuit including a means for producing the relative displacement of sampling instants.